United States Patent [19]

Hope et al.

[11] Patent Number: 4,960,655
[45] Date of Patent: * Oct. 2, 1990

[54] LIGHTWEIGHT BATTERIES

[76] Inventors: Henry F. Hope; Stephen F. Hope, both of 5701 Moreland Rd., Willow Grove, Pa. 19090

[*] Notice: The portion of the term of this patent subsequent to Dec. 27, 2005 has been disclaimed.

[21] Appl. No.: 302,622

[22] Filed: Jan. 27, 1989

[51] Int. Cl.$^5$ ............................................. H01M 6/18
[52] U.S. Cl. ................................... 429/192; 429/209; 429/245
[58] Field of Search ................... 429/191–193, 429/218, 212, 232, 245; 252/510, 511, 182.1; 524/495, 496

[56] References Cited

U.S. PATENT DOCUMENTS

| 4,471,037 | 9/1984 | Bannister | 429/191 |
| 4,496,638 | 1/1985 | Sugiuchi et al. | 429/192 |
| 4,497,883 | 2/1985 | Murray | 429/194 |
| 4,520,086 | 5/1985 | Skotheim | 429/192 |
| 4,576,883 | 3/1986 | Hope et al. | 429/192 |
| 4,794,059 | 12/1988 | Hope et al. | 429/192 |

Primary Examiner—Anthony Skapars
Attorney, Agent, or Firm—Zachary T. Wobensmith

[57] ABSTRACT

Lightweight alkaline metal or alkaline earth metal batteries which have a base current collector and carrier that includes a base of carbon or graphite and a coating thereon.

21 Claims, 1 Drawing Sheet

LIGHTWEIGHT BATTERIES

BACKGROUND OF THE INVENTION

1. Field of the Invention

This invention is directed to light weight alkaline metal to alkaline earth metal batteries where the current collector and carrier includes a base of carbon or graphite material which has had a coating applied thereto.

CROSS REFERENCE TO RELATED APPLICATIONS

This application is a continuation in part of our prior application Ser. No. 288,714, filed on Dec. 22, 1988 which was a continuation in part of our prior application Ser. No. 161,724, filed Feb. 29, 1988 for Lightweight Solid State Rechargeable Batteries, now U.S. Pat. No. 4,794,059.

2. Description of the Prior Art

There has been considerable interest in alkaline metal or alkaline earth metal batteries, and the components therefor, due to the many advantages that they and particularly lithium provide, when properly handled and incorporated into batteries. Examples of prior art electrochemical cells, batteries and their components are found in the article by Hooper, et al. Advanced Battery Development, Odense University Press, 1984 and in the Basu, U.S. Pat. No. 4,304,825; Andre et al., U.S. Pat. No. 4,357,401; Bannister, U.S. Pat. No. 4,471,037; Sugiuchi et al., U.S. Pat. No. 4,496,638; Skotheim, U.S. Pat. NO. 4,520,086; Hope et al., U.S. Pat. No. 4,576,883; Kalnin et al., U.S. Pat. No. 4,707,423; and Hope et al., U.S. Pat. No. 4,794,059.

As described in the prior art, alkaline battery construction usually includes the deposition of an alkaline earth metal or alkaline metal, such as lithium onto a metal foil base, which base serves as a current collector and carrier.

As is known, while alkaline metals and alkaline earth metals are highly reactive, they are particularly suitable for use in batteries due to their ionic and electrical properties. Such metals are usually bonded or coated onto current collecting and carrying bases of metal foil, such as copper, nickel or aluminum. The alkaline metals used would include lithium, sodium, potassium and cesium, with lithium being particularly popular for incorporation into batteries. The alkaline earth metals would include beryllium, magnesium, calcium, strontium and barium. It has been observed that while alkaline earth or alkaline metals, such as lithium, may initially appear to not react with copper, or other metal foil bases, that over a period of time the metals often react unfavorably with the metal foil, and form an alloy with the metal, resulting in decreased efficiency and a shorter than desired service life. It is very important that the base metal foil be free from impurities, but this is difficult to accomplish, and the alkaline or alkaline earth metal may react with even minute amounts of impurities associated with the foil. The base metal foil accounts for as much as 50% of the total battery weight, so that a reduction in weight is also desirable and will increase the energy density of the battery. It is important therefore to provide a suitable current collector which reduces the total battery weight, and is inert to the problems associated with the use of alkaline metals, or alkaline earth metals, while enhancing their desirable properties.

SUMMARY OF THE INVENTION

It has now been found that the use of a base current collector and carrier that includes a base of inert carbon or graphite material which has had a coating applied thereto, in alkaline metal or alkaline earth metal batteries, provides a battery with a longer shelf life, reduces the cost and weight of the battery, permits greater flexibility in manufacturing such batteries, and provides other benefits.

The principal object of the invention is to provide a light weight battery wherein the base current collector and carrier is non-reactive with alkaline or alkaline earth metals.

A further object of the invention is to provide a battery which is of reduced weight.

A further object of the invention is to provide a battery that is easy to manufacture and form into desired configurations.

A further object of the invention is to provide a battery that has a base current collector and carrier which has a greater contact surface area, and consequent greater efficiency and capacity than other such bases.

A further object of the invention is to provide a battery in which the base current collector and carrier may be used in either the anode or the cathode of the battery.

A further object of the invention is to provide a battery in which the base current collector and carrier may be dip coated in alkaline or alkaline earth metal.

A further object of the invention is to provide a battery which has a base current collector and carrier of low resistance.

A further object of the invention is to provide a battery wherein the base current collector and carrier may have strands of wire incorporated therein to improve its current conducting characteristics.

A further object of the invention is to provide a battery which may have a separator between the anode and cathode, which has been impregnated with electrolyte.

A further object of the invention is to provide a battery which has a single base current collector and carrier, but may be of double configuration.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course , be understood that the description and drawings herein are illustrative merely and that various modifications and changes can be made in the structures disclosed without departing from the spirit of the invention.

DESCRIPTION OF THE PREFERRED EMBODIMENTS

Solid state alkaline metal or alkaline earth metal batteries, and for example lithium batteries, consist of at least an anode layer, a polymer dielectric layer, and a cathode layer. Such batteries can be of virtually any desired size and configuration, and usually include additional layers such as current conducting backing layers, insulating layers and electrode connection layers.

Figure 1:
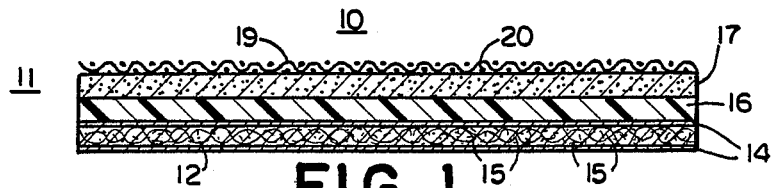
FIG. 1 is a diagrammatic view of one embodiment of a battery incorporating a base current collector and carrier constructed in accordance with the invention.

Referring now more particularly to the drawings and FIG. 1 thereof one embodiment of a battery 10 having a base current collector and carrier in accordance with the invention is therein illustrated.

The battery 10 to be described is of lithium metal construction, but other alkaline metals, or alkaline earth metals, can be used if desired. The battery 10 includes a base 11, which acts as a current collector and carrier for the battery.

The base 11 as illustrated includes a layer of carbon, or graphite material. The layer 12 may be of a web, or solid ribbon construction. If the layer 12 is of ribbon construction it may be formed of carbon material by any suitable process. In one such well known process polyacrylonitrile ribbon from a roll, (not shown) is passed through a high heat chamber where the material is transformed into carbon. In another well known process, carbon or graphite in powder form is mixed with a suitable binder (not shown) to form the ribbon 12. Carbon or graphite fibers in chopped form may also be used with a binder to form the ribbon 12.

Regardles of the process, the resultant layer 12 of carbon or graphite material should be substantially free from impurities and have a resistance as low as 700 ohms.

If it is desired to form the layer 12 of a web of carbon or graphite material, which is the form illustrated in FIG. 1 the web of carbon fibres may be woven. While the web is illustrated as being of woven construction, side by side strands (not shown) of fibers may also be used. The layer 12 in FIG. 1 is formed of strands 15 or carbon fibre of well known type which material is substantially free from impurities and has a resistance as low as 700 ohms.

The base 11 when used in an anode may be fabricated by taking the base layer 12 of carbon or graphite material, and dipping it into a tank, (not shown) which contains an alkaline earth or alkaline metal such as lithium (not shown) in molten form.

The layer 12 is surrounded and coated by the molten lithium forming a layer 14 on both sides, which provides maximum surface contact area, which greatly improves performance and capacity, in contrast with conventional lithium battery construction, where one side of a flat web of metal foil is coated with lithium. Because of the configuration of the layer 12, the layer may be coated by the well known wave soldering method, which is not possible on metal foil, due to the liquidity of lithium. Spraying or other coating methods may also be used as desired. It should be noted that while the layer 12 is illustrated in band-like form, of indefinite length, other configurations can be porvided. In fact, the base (not shown) can be of rod, rope, plate, hollow tube or other desired shapes as required by the user. After coating with lithium, the base 11 may have a layer 16 of polymeric electrolyte composition applied thereto, which composition may be of a suitable polymeric material such as polyethylene oxide compounded with lithium salt, and as is more fully described in our prior U.S. Pat. No. 4,576,883. The electrolyte mixture may be applied to the layer 12 to form the layer 16, by any suitable technique such as the well known doctor blade, or extruding techniques.

A layer 17 of cathode material is applied on top of layer 16, which may be a thin layer of polymer spheres, which have encapsulated finely ground particles of an intercalation compound, such as vanadium oxide compound, such $V_6O_{13}$, to which carbon black was added to improve the electrical conductivity, and an organic solvent. The resultant cathode provides a second collector 19. To further improve the current carrying characteristics of the structure a fine wire mesh 20 may be provided on top of and in contact with the cathode collector 19.

It should also be noted that the base (not shown) could be fabricated of a conductive plastic such as Kapton available from I. E. DuPont de Nemours, Wilmington, Delaware, to which powdered carbon has been added.

While the base 11 described above is useful in an anode the layer 12 may also be incorporated into a cathode (not shown) as a base current collector and carrier. When using the layer 12 in a cathode it is not necessary to coat it with metal, but it is coated with active cathode material (not shown) and provides the desired current collecting and carrying characteristics.

Figure 2:
FIG. 2 is a diagrammatic view of an embodiment of a base current collector and carrier for a battery, constructed in accordance with the invention.

Referring now to FIG. 2 another embodiment of base current collector and carrier 100 is there illustrated. The base 100 includes a layer 101 of carbon or graphite material, with strands of metal wire 103, such as nickel wire, therein and extending longitudinally with the base layer 101. While nickel wire is described, other suitable compatible current carrying materials can be used as desired. The addition of wire strands 103 is desirable in certain applications, and provides increased current carrying properties. The layer 101 may be further assembled into a battery (not shown) as described above for FIG. 1.

Figure 3:
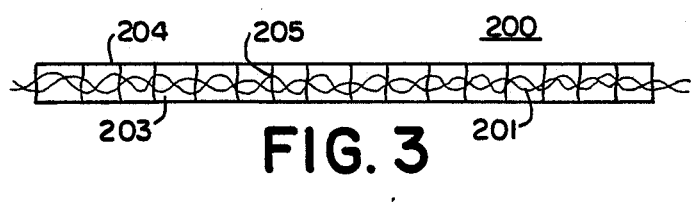
FIG. 3 is a diagrammatic view of another base current colector and carrier for a battery, constructed in accordance with the invention.

Referring now to FIG. 3 another embodiment of base 200 is therein illustrated. The base 200 includes carbon or graphite material 201 which has had wire mesh 203 incorporated therein, which is of the "chicken wire" open mesh configuration, with both longitudinal and transverse strands 204 and 205. The strands 204 and 205 may be of nickel but other suitable materials may be used as desired. The resultant base 200 may be further assembled into a battery as described above for FIG. 1.

Figure 4:
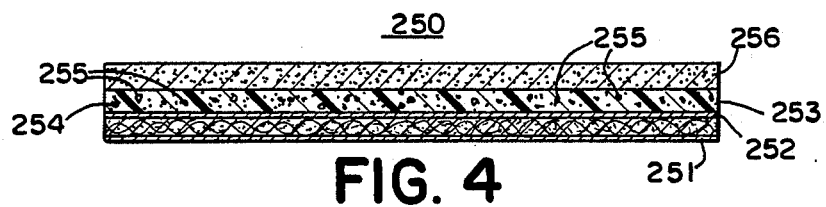
FIG. 4 is a diagrammatic view of another embodiment of a battery incorporating a base current collector and carrier constructed in accordance with the invention.

Referring now to FIG. 4, another embodiment of battery 250 constructed in accordance with the invention is therein illustrated.

The battery 250 includes a layer 251 of carbon graphite material which is shown in ribbon form. The layer 251 may have layer 252 of alkaline or alkaline earth metal applied thereon by any desired process as described above. A separator 253 which includes a sheet 254 of porous inert plastic such as polypropylene is impregnated with electrolyte 255 of well known type, such as described above, and then pressed (not shown) against layer 251 to which it bonds in.well known manner. A layer 256 of cathode material such as described in our prior U.S. Pat. No. 4,576,883, is applied to separator 253 and forms a second collector. Other suitable layers may then be applied as desired.

Figure 5:
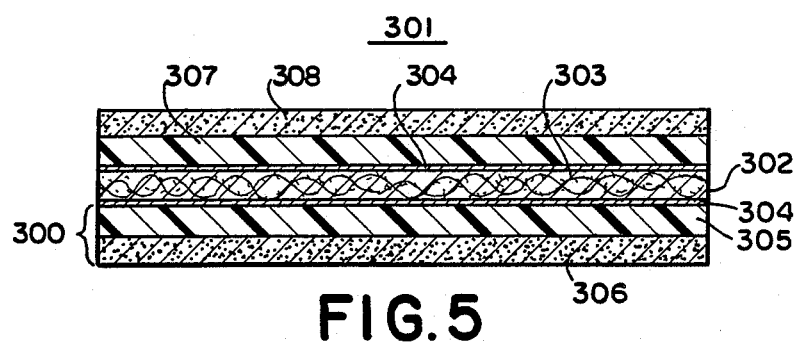
FIG. 5 is a diagrammatic view of a battery incorporating a double sided base current collector and carrier constructed in accordance with the invention.

Refering now to FIG. 5 a double sided base current collector and carrier battery construction is illustrated, the base 300 having been formed for an anode as described in FIG. 1.

For illustrative purposes assume that a battery 301 has been formed in accordance with FIG. 1, and which includes a layer 303, of carbon or graphite, which has had a coating of lithium 304 applied thereto, to which a layer 305 of polymeric electrolyte composition has been applied, and a second layer 306 of cathode material has been applied on top of layer 305 to form a cathode. The coated base 300 is then inverted, and a layer 307 of polymeric electrolyte composition as described above is applied thereto, on top of which a layer of cathode material 308 is applied, which results in a double battery using but one base 302 as a current collector and carrier, thus saving 50% of collector material.

It will thus be seen that structures have been provided with which the objects of the invention are achieved.

We claim:

1. In a battery of the alkaline or alkaline earth metal type which includes an anode, a polymer dielectric layer, a cathode, and having current collection and carrying base means which comprises
   a base current collector and carrier of carbon or graphite and
   a coating on said base.
2. A battery as defined in claim 1 in which
   said current collecting and carrying means is part of said cathode, and said coating is of active material.
3. A battery as defined in claim 1 in which
   said current collecting and carrying means is a part of said anode, and
   said coating is of metal.
4. A battery as defined in claim 3 in which
   said coating of metal on said base is an alkaline metal.
5. A battery as defined in claim 3 in which
   said coating of metal on said base is an alkaline earth metal.
6. A battery as defined in claim 1 in which
   said base is of powdered carbon or graphite and a binder.
7. A battery as defined in claim 1 in which
   said base additionally includes a plurality of single strands of metal wire interspersed in said carbon or graphite material.
8. A battery as defined in claim 1 in which
   said base includes a layer of open mesh conductive metal wire.
9. A battery as defined in claim 1 in which
   said base is a solid ribbon of carbon or graphite.
10. A battery as defined in claim 1 in which said base is a solid ribbon of carbon or graphite and a binder.
11. A battery as defined in claim 1 in which said base is a web of carbon or graphite fibers.
12. A battery as defined in claim 11 in which said web is woven.
13. A battery as defined in claim 11 in which said web is of side by side carbon fibre or graphite strands.
14. A battery as defined in claim 11 in which said web includes a plurality of single strands of metal wire interposed with said carbon fibre or graphite strands.
15. A battery as defined in claim 1 in which said web includes a layer of open mesh conductive metal wire and said strands of carbon fibre or graphite are interwoven with said open mesh wire.
16. A battery as defined in claim 1 in which
    said base means is of conductive plastic and powdered carbon or graphite.
17. A battery as defined in claim 1 in which said cathode has a fine wire mesh in contact therewith.
18. A battery as defined in claim 1 in which
    said dielectric layer is a sheet of plastic which has been impregnated with electrolyte.
19. A battery as defined in claim 1 which is rechargeable.
20. A battery as defined in claim 1 which is non-rechargeable.
21. A battery as defined in claim 1 in which said base is of chopped carbon fibers and a binder.

* * * * *

UNITED STATES PATENT AND TRADEMARK OFFICE
CERTIFICATE OF CORRECTION

PATENT NO. : 4,960,655

DATED : October 2, 1990

INVENTOR(S) : Henry F. Hope and Stephen F. Hope

It is certified that error appears in the above-identified patent and that said Letters Patent is hereby corrected as shown below:

Column 2
Line 8, after "battery," insert -- permits the base to function as a double sided collector, --

Signed and Sealed this

Tenth Day of March, 1992

Attest:

HARRY F. MANBECK, JR.

*Attesting Officer*    *Commissioner of Patents and Trademarks*